Feb. 26, 1963 R. K. DAHLIN 3,079,600

RADAR ERROR SIGNAL MEMORY CIRCUIT

Filed Nov. 4, 1957 4 Sheets-Sheet 1

INVENTOR.
ROBERT K. DAHLIN
BY John A Duffy

AGENT

Feb. 26, 1963 R. K. DAHLIN 3,079,600

RADAR ERROR SIGNAL MEMORY CIRCUIT

Filed Nov. 4, 1957 4 Sheets-Sheet 2

INVENTOR.
ROBERT K. DAHLIN
BY John A. Duffy
AGENT

RADAR ERROR SIGNAL MEMORY CIRCUIT

Filed Nov. 4, 1957 4 Sheets-Sheet 3

INVENTOR.
ROBERT K. DAHLIN
BY Allan Rothenberg
ATTORNEY

INVENTOR.
ROBERT K. DAHLIN

BY Allan Rothenberg

ATTORNEY

United States Patent Office 3,079,600
Patented Feb. 26, 1963

3,079,600

RADAR ERROR SIGNAL MEMORY CIRCUIT

Robert K. Dahlin, Lakewood, Calif., assignor to North American Aviation, Inc.

Filed Nov. 4, 1957, Ser. No. 694,408
7 Claims. (Cl. 343—17.1)

Figure 1:
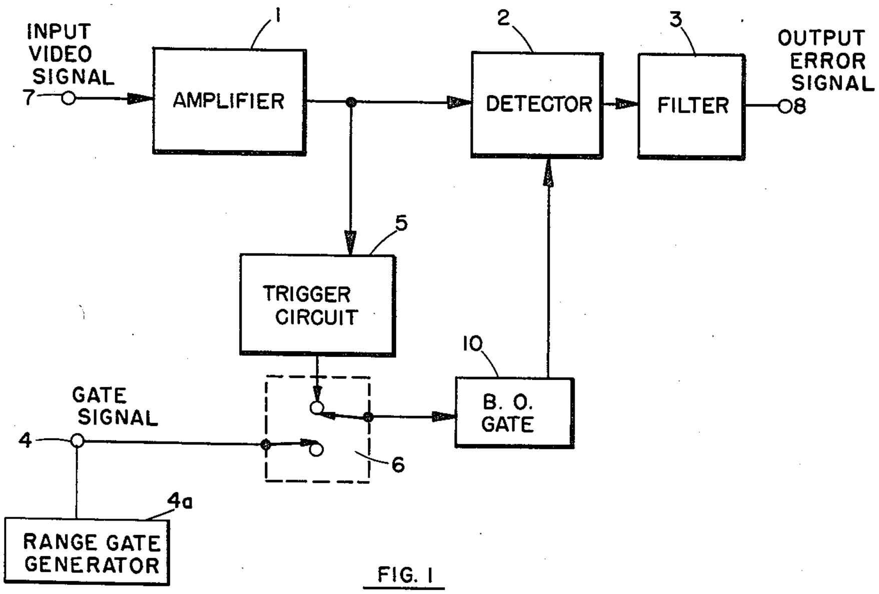

This invention relates to target tracking radar systems and more particularly to an error signal memory circuit for preventing false transient signals in the error output upon loss of a signal from the target.

In automatic tracking radar systems, circuits are provided for indicating the range and direction of targets for the tracking radar. The design of these circuits to meet the exacting requirements of present-day missiles and aircraft systems has posed many problems. One of the more serious difficulties presented is the providing of an accurate output angular error signal during all phases of tracking. The angular tracking error signal in a conical scan pulse echo radar system appears at the output of an error detector as an alternating-current signal with an amplitude representing the amount of angular error and a phase representing the direction of the angular error. This tracking error signal is first produced in the form of an error voltage which appears as an amplitude modulation signal of the video pulse echo input signals. In order to utilize the error signal, the modulated voltage must be demodulated and filtered for efficient use in the radar circuitry. A common method of demodulating this signal is to provide a peak detector which responds to the envelope of the incoming pulse signal. In normal tracking operation this provides a satisfactory output signal. However, in some tracking operations wherein the return signal from the target being tracked is momentarily lost by the antenna of the radar, resulting in a lack of echo pulses being received by the tracking circuit, a phenomenon occurs which results in inaccurate tracking of the target. When the peak detector, which is demodulating the desired video signal inputs separated from other signals by gate signals from other radar circuitry, no longer receives a video signal due to lack of pulses returning from the target to the radar antenna, an erroneous error output signal is produced. The incoming signal disappears and a decay of the direct-current level is produced which provides an erroneous output error voltage. This false error signal causes slewing of the antenna which deteriorates tracking and may even result in complete loss of the target. When the target pulse input to the antenna begins again, a similar erroneous error voltage is created in the demodulator which again causes slewing of the antenna. This problem is so serious in radar circuitry as to require a definite means for avoiding the above-mentioned false error signals.

Present-day radar systems overcome the above-mentioned problems by slowing the response of the circuit with smoothing circuits and other devices which only partially solve the problem, leaving much to be desired. Present-day tracking radar systems still produce false output error signals upon momentary loss of target by the radar antenna.

The circuit of this invention overcomes the above and other disadvantages by providing a simple and reliable system which provides a trigger circuit for maintaining an average direct-current level signal in the absence of incoming pulse signals. The circuit comprises trigger circuit means responsive to the modulated video signals for actuating a detector and disconnecting gate signals from the detector, thus providing a gate signal into the detector only when video signals are being received by the antenna. In order to accomplish this, the trigger circuit is connected to be responsive to the modulated video signals and is connected to the demodulator to provide a gating signal thereto. In addition, means are provided for disconnecting the gating signal from the demodulator which was provided by the gating means in the radar system. Means are provided for isolating the trigger circuit from the remainder of the radar circuitry and for preventing the demodulator from causing a false error voltage.

It is therefore an object of this invention to provide improved angle tracking error producing means.

It is another object of this invention to provide a circuit which produces a memory signal to an error producing means in the absence of video pulse signals.

It is still another object of this invention to provide a circuit which is responsive only to target echo signals for producing angular tracking error signals.

It is a further object of this invention to provide an improved demodulator circuit in a radar tracking error producing means.

Figure 2:
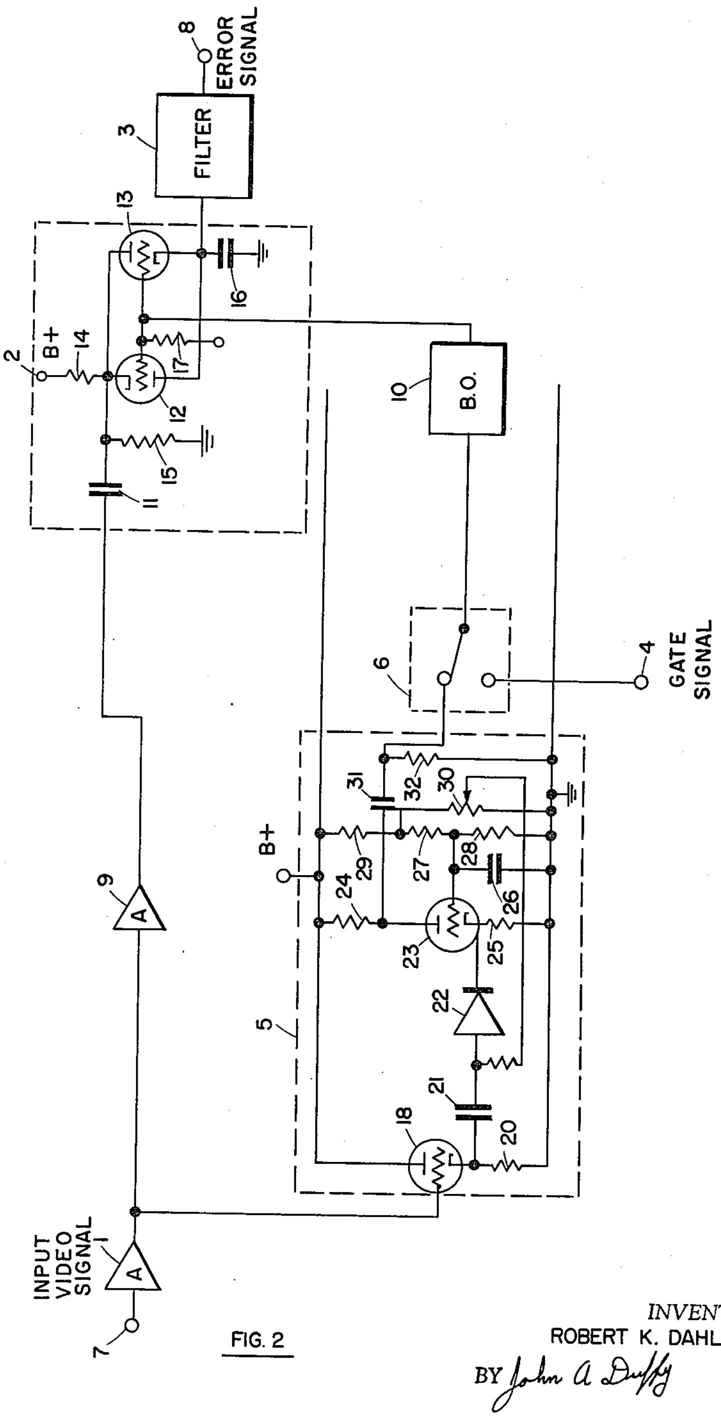
Figure 3A:
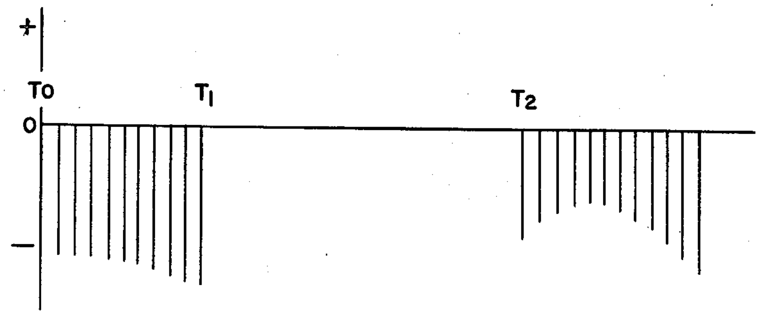
Figure 3B:
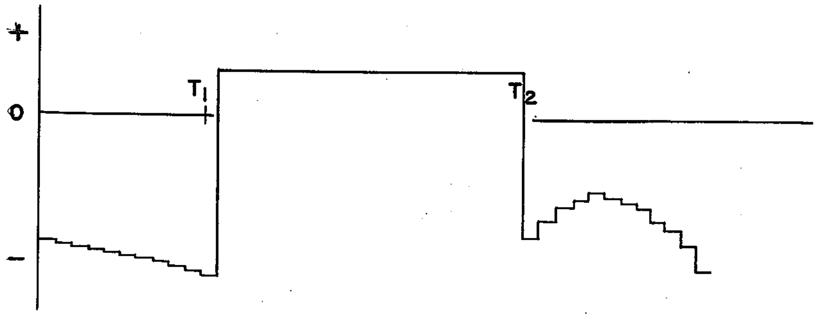
Figure 3C:
Figure 3D:
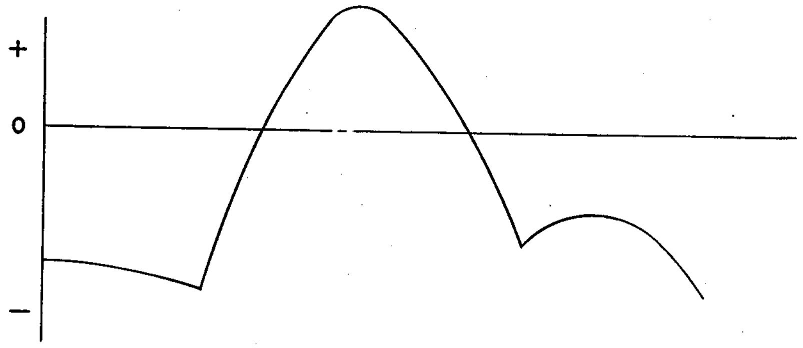
Figure 4A:
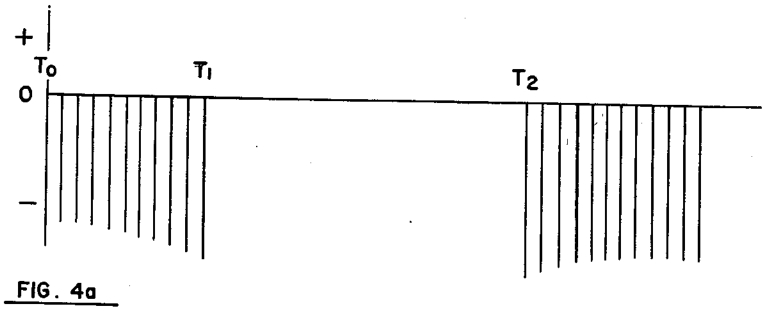
Figure 4B:
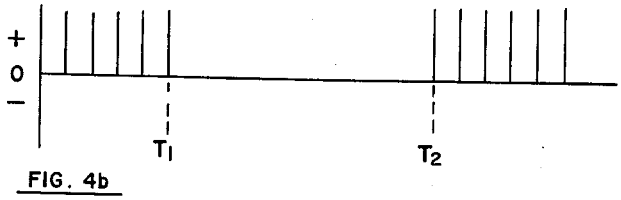
Figure 4C:
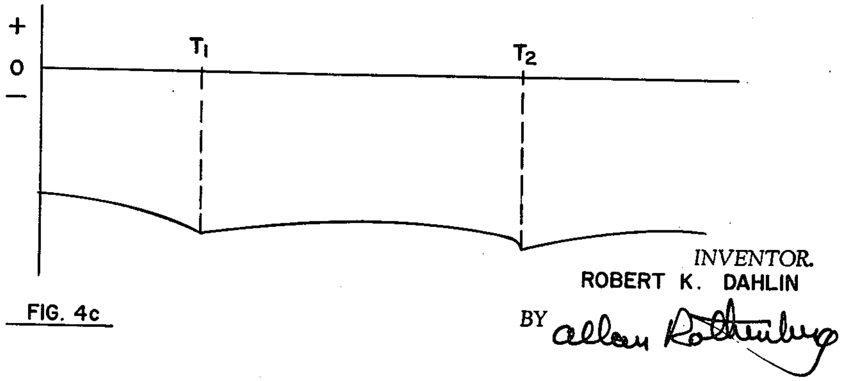

Other objects of this invention will become apparent from the following description taken in connection with the accompanying drawings, in which FIG. 1 is a schematic diagram in block form which shows a preferred embodiment of the memory circuit of this invention;

FIG. 2 is a circuit diagram of the invention;

FIGURES 3*a*, 3*b*, 3*c*, and 3*d* are a series of graphs showing the waveform characteristics of the radar circuitry without the trigger circuit in operation; and FIGURES 4*a*, 4*b* and 4*c* are a series of graphs showing the waveform characteristics of the circuitry with the trigger circuit in operation.

In order to more clearly set forth the operation of the circuit of this invention, reference will be made to some of the operation of automatic target tracking radar systems. In one of these, a target echo signal is operated upon by a coincidence amplifier associated with a range gate signal and other appropriate circuitry to produce a video signal which appears as an amplitude modulated waveform of the target echo pulse train. This modulated video signal is demodulated by circuitry which may be, for example, the well-known box car detector keyed by a range gate signal. The demodulated output signal from the box car detector is passed through a low pass filter for removing unwanted carrier frequency and is presented, as an alternating-current error signal, to the antenna positioning control circuitry in the radar system.

Referring now to FIG. 1, there is shown in block, amplifier 1 which is adapted to receive video input signals from terminal 7. The video pulses at terminal 7 represent the target echo pulses which have been amplitude modulated by radar circuitry which is not a part of this invention. Amplifier 1 produces an amplified video signal output which is fed to one of the inputs of detector 2. Detector 2 demodulates the video signal received from amplifier 1 in accordance with a gate signal normally received from terminal 4. The demodulated signal from detector 2 is fed into filter 3 which produces an alternating-current error signal at output terminal 8 which is presented to the remainder of the radar system to provide the necessary control signals to track the target. The gating signal received from input terminal 4 represents a tracking gate signal from radar circuitry including a range gate generator 4*a*, not a part of this invention. The gate signal is fed through manual switch 6 and blocking oscillator gate 10 to detector 2. Detector 2 may also receive a gating signal from trigger circuit 5 when switch 6 is connected to trigger circuit 5 instead of terminal 4. Trigger circuit 5 is connected to receive a video signal from the output of amplifier 1 and provides an output signal in accordance therewith through manual switch 6 to detector 2. Thus, it can be seen that the gating signal received by detector 2 may be received from two sources depending on the position of switch 6. One source is terminal 4 which receives gate signals and the other source is trigger circuit 5 which produces a gate signal upon receipt of a video signal from amplifier 1.

In operation, with trigger circuit 5 connected through switch 6 to detector 2 as shown in FIG. 1, the video input signal from amplifier 1 is connected to trigger circuit 5 which receives the video pulses and produces a trigger signal responsive thereto to blocking oscillator 10 which provides a gating signal to detector 2. Detector 2 demodulates the video signal received from amplifier 1 in accordance with the gate signal from trigger circuit 5 and provides a demodulated error signal to filter 3. Filter 3 produces a filtered and demodulated alternating-current error signal at terminal 8. Having switch 6 in the position shown in FIG. 1 wherein trigger circuit 5 is connected to detector 2, detector 2 will produce a demodulated error signal only when video signals are received from terminal 7, since trigger circuit 5 will not produce a trigger signal when no video signal is being received. Upon loss of a video signal trigger circuit 5, not receiving an input signal from amplifier 1, will not produce a gating signal to gate detector 2 and therefore no increase or decrease in output signal will be presented to filter 3 or output terminal 8. Manual switch 6, of course, may be placed in the position if it is desired, to allow terminal 4 receiving gate signals from the radar to control detector 2. Such an operation may be necessary, for example, when the target is very near or very far from the radar.

Referring now to the circuit diagram in FIG. 2 of the embodiment shown in FIG. 1, a source of modulated video pulses is received at terminal 7 and presented to amplifier 1. The positive video pulses of the output of amplifier 1 are inverted at capacitor 11 by amplifier 9 to produce a series of negative pulses which are coupled to triodes 12 and 13 which form a bidirectional or box-car switch. The cathode of triode 12 and the plate of triode 13 are coupled in common through capacitor 11 to the output of amplifier 9. The cathode of triode 12 is connected through resistor 14 to B+ and through resistor 15 to ground to establish a reference potential. The grids of triodes 12 and 13 are connected in common and receive an input control potential from the blocking oscillator 10 triggered by the output of switch 6 to be described below. The plate of triode 12 and the cathode of triode 13 are connected in common through memory capacitor 16 to ground and to output terminal 8. Resistor 17 connects the grids of triodes 12 and 13 to a B— source to establish a negative cutoff potential on the grids of triodes 12 and 13 when no signal is received from switch 6.

The output of amplifier 1 is also connected to the grid of triode 18 which functions as a cathode follower receiving operating potentials from a B+ supply to its plate and from ground through resistor 20 to its cathode. Amplifier 18 is coupled through capacitor 21 to the plate of unidirectional device 22 which may be, for example, a germanium diode. The cathode of diode 22 is connected to the cathode of triode 23 which functions as a grounded grid amplifier receiving operating potentials from B+ through resistor 24 to its plate and ground through resistor 25 to its cathode. Amplifier 23 has its grid coupled to ground through capacitor 26 and also has its grid connected to a point in common with resistors 27 and 28 which are connected in series with resistor 29 between B+ and ground. Resistor 30 is connected across resistors 28 and 27 and has a wiper connected to the plate of diode 22. Adjustment of the wiper on resistor 30 varies the potential between the cathode and plate of diode 22 in order to set a level or minimum amplitude at which signals will be passed by diode 22. This level set is necessary to avoid noise triggering of detector 2 in the absence of an input signal at terminal 7. The output of amplifier 23 is coupled through capacitor 31 and resistor 32 to switch 6 which is shown as a single-pole manually operated switch. Switch 6, in the position shown in FIG. 2, couples the output of capacitor 31 and resistor 32 to blocking oscillator 10 which provides a gating signal to the grids of triodes 12 and 13. Switch 6 may also be connected to terminal 4.

In operation, a video input signal received from the target by associated radar circuitry and presented to terminal 7 is amplified by amplifier 1 and appears as an amplitude modulated pulse waveform of positive polarity proportional to the video signal from the target. These video pulses are inverted by amplifier 9 to produce negative polarity pulses and coupled through capacitor 11 to detector 2 where they are demodulated when gate signals are received from trigger circuit 5. The current path from B+ through the plate-cathode circuit of triode 13 acts as a discharging path for the negative charge on capacitor 16. The current path from capacitor 16, the plate-cathode circuit of triode 12, and capacitor 11 act as a charging path for capacitor 16. Thus, as the pulse signal applied to the cathode of triode 12 and the plate of triode 13 goes more negative, capacitor 16 charges more negative through triode 12. Conversely as the pulse signal from capacitor 11 goes more positive, capacitor 16 discharges through triode 13. Therefore, it is readily apparent that capacitor 16 is charging negatively lowering the potential of output terminal 8 when the video input signal is going negative and discharging raising the potential of output terminal 8 when the video input signal is going positive.

In order for either the charge or discharge paths to be open a signal must be received at the grids of triodes 12 and 13 from blocking oscillator 10. The video signal from amplifier 1 is fed into the grid of triode 18 which serves to isolate trigger circuit 5 from the remainder of the radar circuitry. Triode 18 cathode couples the video signal through capacitor 21 to diode 22. Diode 22 passes a signal of minimum predetermined amplitude, thereby setting the input signal amplitude level at which gate triggering signals will be generated. The predetermined reference level is adjusted by varying the wiper on resistor 30. The video signal is fed from diode 22 to the cathode of amplifier 23 which retains the polarity of the signal and amplifies it sufficiently to cause conduction in triodes 12 and 13. The plate of triode 23 couples the signal through capacitor 31 and switch 6 to blocking oscillator 10 which provides a gating signal to the grids of triodes 12 and 13.

Thus, when a modulated video pulse signal appears at terminal 7 an alternating-current error signal which is proportional to the modulation of the video signal is produced at terminal 8 after being filtered by filter 3. This is superimposed upon a D.-C. level which is proportional to the average video amplitude.

Thus far, the circuitry of FIG. 2 has been described for operations when switch 6 is connecting trigger circuit 5 to detector 2. Should it become desirable to operate the detector circuitry conventionally by having the gating signals supplied by the tracking gate associated with the radar system, switch 6 may then be switched to connect terminal 4 to detector 2. It has been found that better operation will occur by having gate signals from terminal 4 supplying the input to detector 2 rather than the trigger circuit in regions of very low and very high signal levels.

For better performance of the circuitry of FIG. 2 it has been found advantageous to provide a long time constant for the discharging of capacitor 16 in detector 2. Having a comparatively long time constant minimizes transients caused by loss of input signal.

Turning now to FIGS. 3 and 4, graphs are shown which indicate the waveform characteristics at pertinent points in the circuitry of FIG. 2. FIG. 3 shows the waveform characteristics when switch 6 connects terminal 4 to detector 2 thus allowing the gate signals from the radar to provide the gate to detector 2 instead of the trigger circuit as is customary in the present art. In FIG. 3*a* there is shown the waveform of the modulated video input signals which are presented to the input of detector 2. FIG. 3*b* shows the waveform at the output of detector 2. FIG. 3*c* shows the gate signals as they arrive at detector 2 from terminal 4. FIG. 3*d* shows the filtered error output signal at terminal 8. In FIG. 3*a* it can be seen that at time $T_1$, for example, the video pulse signals have been lost and no input video signals are received until time $T_2$. However, it is apparent from FIG. 3*c* that gate signals are being continually received at detector 2 even when no video signal is received. When detector 2 receives a gating signal without receiving a video signal, the direct-current output of detector 2 suddenly goes from the normal pulse amplitude toward the potential at the junction of resistors 14, 15 as indicated in FIG. 3*b*. Since filter 3 is designed to be resonant at the error frequency for maximum carrier rejection a ringing of the filter results from the sudden drop of the direct-current level from the normal pulse amplitude (for which the filter 3 was designed) to zero. This action creates one or more cycles of error voltage at the output of filter 3 at a phase determined by the time of dropout. The result is shown in FIG. 3*d*. This error voltage is a false signal and causes excessive slewing of the antenna which is attempting to follow the false signal. The error modulation of the video pulses after time $T_2$ in FIG. 3*a* represents the actual antenna pointing error resulting from the false error signal produced by the filter ringing, assuming that the antenna beam was still on the target after being falsely slewed. If the lost time is greater, the antenna beam will be completely off target and no pulses or error signal will appear.

When trigger circuit 5 is connected to supply the gating signal to detector 2 instead of the gate from the radar, no false error signals are produced. In FIG. 4 video pulse signals are again presented in FIG. 4*a*. FIG. 4*b* represents the gating pulses supplied to detector 2. It is most significant that at the $T_1$ when the video signals drop out and are lost no gate signal is being supplied to detector 2 because as shown in FIG. 4*b* and described above for relation to FIG. 2, trigger circuit 5 does not produce a signal to trigger blocking oscillator 10 since no input is being received by trigger circuit 5 from amplifier 1 due to the loss of video signals. Since no gates are created in detector 2 when video signals are lost, the output of detector 2 will remain at the last level received until time $T_2$ when video signals are again being received. Therefore, filter 3 will not be excited to produce the false error voltage. The error signal at terminal 8, as shown in FIG. 4*c*, is substantially an average direct-current level signal with only the pre-drop-out error signal and a small transient on resumption of video signals superimposed thereon.

Operation of the above described circuitry is substantially the same for operation with trigger circuit action as it is for operation with normal range gate triggering when video pulse signals are being received.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulse echo radar system wherein is provided a means for generating a video signals responsive to target echo pulses and means for generating gate signals, and wherein is also provided an output control means responsive to said video signals and said gate signals for providing an output error signal when energized by said gate signal generating means, the improvement comprising means for disconnecting said gate signal generating means from said control means, and a circuit for energizing said control means upon disconnection of said gate signal generating means, said circuit comprising means for receiving said video signals and isolating said circuit from said video signal generating means, and means responsive to said receiving and isolating means for energizing said control means.

2. In a pulse echo radar system wherein is provided means for developing video signals responsive to pulse echo and range gating signals, a circuit for energizing a control means only when said video signals are present, said circuit comprising a cathode follower amplifier coupled to the source of video signals for isolating said circuit from said video circuit and for receiving said video signals, means for selecting the amplitude level of the signals at the output of said cathode follower amplifier, grounded grid amplifier means responsive to the output of said amplitude selector means for amplifying and retaining the polarity of said video signal, means responsive to the output of said grounded grid amplifier means for generating gate pulses, said control means responsive to said first mentioned means and said gate pulses for being energized only when said video signals are being received.

3. In a pulse echo radar system wherein is provided a means for receiving video signals responsive to a target and means for generating gate signals, and wherein is also provided an output control means responsive to said video signals for presenting an output error signal when energized by said gate signal generating means; the improvement comprising means for disconnecting said gate signal generating means from said control means, and a circuit for energizing said control means upon disconnection of said gate signal generating means, said circuit comprising means coupled to said video receiving means for isolating said circuit from said video receiving means and for receiving said video signals, means for selecting the level of the output of said isolating and receiving means to a minimum predetermined amplitude, means responsive to the output of said level setting means for amplifying and retaining the polarity of the signal from said level setting means, said control means responsive to the output of said amplifying means.

4. In a pulse echo radar system, means for receiving video signals, first means for generating gate signals, detector means responsive to said video signals and said first gate signals for presenting an output signal, second means responsive to said video signal receiving means for generating gate signals, and means for connecting said second gate generating means to said detector means and disconnecting said first gate generating means from said detector means.

5. The combination of claim 4 wherein said second means for generating gate signals includes means coupled to said video receiving means for isolating said circuit from said video receiving means and for receiving said video signals, means for selecting the level of the output of said isolating and receiving means to a minimum predetermined amplitude, means responsive to the output of said limiter means for amplifying and retaining the polarity of the signal from said limiter means, said detector means responsive to the output of said amplifying means.

6. In a pulse echo radar system, means for receiving video signals, first means for generating range gate signals, detector means responsive to said video signals and said first range gate signals for providing an output signal, second means responsive to said video signal receiving means for generating gate signals, and means for connecting said second gate generating means to said detector means and disconnecting said first gate generating means from said detector means.

7. In a pulse echo radar system wherein is provided a detector means for detecting amplitude modulated video pulses and a source of range pulses of equal recurrence rate and different time phase connected thereto, the improvement comprising; means for disconnecting said range pulses from said detector means, means responsive to said video pulses for generating gate pulses, and means for connecting said detector means to said means for generating gate pulses.

References Cited in the file of this patent

UNITED STATES PATENTS

| | | |
|---|---|---|
| 2,418,127 | Labin | Apr. 1, 1947 |
| 2,532,338 | Schlesinger | Dec. 5, 1950 |